Patented June 6, 1950

2,510,078

UNITED STATES PATENT OFFICE 2,510,078

PLASTICIZED POLYMERS

John Denny Compton, Wilmington, Del., Joseph W. Justice, Woodstown, N. J., and Carl F. Irwin, New Castle, Del., assignors to E. I. du Pont de Nemours & Company, Wilmington, Del., a corporation of Delaware No Drawing. Application July 8, 1948,
Serial No. 37,528

19 Claims. (Cl. 260—29.6)

This invention relates to plasticized polymers such as polymerized tetrafluoroethylene, polymerized chlorotrifluoroethylene and interpolymers of tetrafluoroethylene and chlorotrifluoroethylene, and to methods of preparing such plasticized polymers.

Polymerized tetrafluoroethylene and the methods of preparing it are disclosed and claimed in Patent 2,230,654 to Plunkett. It is generally obtained as a white or brown powder or a jelly which rapidly changes to a powder. It is insoluble in all known solvents, is inert to the usual chemical reagents and does not burn. It is a crystalline material which undergoes a reversible transition at 327° C. and above whereby it becomes less crystalline and somewhat amorphous and loses much of its tensile strength but does not become liquid or fluid, retaining its physical form and being deformable only slowly at high pressures. Also, at temperatures of 327° C. and above, it will sinter, that is, coalesce into a solid mass, but it has no true melting point. It is not affected by hydrocarbon oils and is not softened or swelled by such oils.

Because of its inertness to solvents, chemicals and heat, polymerized tetrafluoroethylene is a very valuable material. However, due to its toughness, inflexibility and low plasticity, even at high temperatures, the usual methods for molding and extruding plastic materials are impractical or uneconomical and hence special techniques have had to be devised for shaping it into even simple forms. A representative technique is that disclosed by Brubaker et al., in Patent 2,400,099. Even with these special techniques, it can be molded into only simple shapes, such as sheets, strips, rods, etc. and machining must be resorted to in order to obtain articles of more complicated design. Heretofore, plasticizing agents for this polymer had not been found.

The polymerized tetrafluoroethylene has a waxy appearance and feel and will not stick to other materials or readily to itself with any mechanical strength. Generally, temperatures of at least 350° C. and pressures in excess of 100 lbs./sq. in. are required to bond one piece of the polymer to another piece thereof and, under such conditions, the material is deformed.

Polymerized chlorotrifluoroethylene and the process for preparing it are disclosed in British Patent 465,520, complete accepted May 3, 1937, issued to I. G. Farbenindustrie Aktiengesellschaft. It is generally similar to polymerized tetrafluoroethylene in its physical and chemical properties. Its chlorine constitutes a substituent which may be subject to attack by certain chemicals, but the polymer is resistant to attack by most chemicals. It appears to have a transition point somewhat lower than polymerized tetrafluoroethylene. Such transition point has not been determined, but has been estimated to be at approximately 225° C. It is harder but has a lower softening point than polymerized tetrafluoroethylene and can be molded, extruded and bonded to itself by pressing at about 100 to 200 lbs./sq. in. while heating to 225° C. and above.

Interpolymers of tetrafluoroethylene and chlorotrifluoroethylene may be made by polymerizing mixtures of such monomers in any desired proportions in accordance with the process disclosed by Brubaker, in Patent 2,393,967. The properties of the interpolymers are, as would be expected, intermediate those of polymerized tetrafluoroethylene and polymerized chlorotrifluoroethylene, varying with the proportions of tetrafluoroethylene in the mixture from which they are prepared, and more closely approaching the properties of polymerized tetrafluoroethylene as the proportion of tetrafluoroethylene is increased, in other words, as their composition more closely approaches polymerized tetrafluoroethylene. Prior to our invention, solvents and plasticizing agents for such interpolymers were unknown.

It is a general object of our invention to provide methods for plasticizing polymerized tetrafluoroethylene, polymerized chlorotrifluoroethylene and interpolymers of tetrafluoroethylene and chlorotrifluoroethylene. A specific and particular object is to provide methods for plasticizing polymerized tetrafluoroethylene. Further objects are to provide new plastic compositions of matter which are plasticized polymerized tetrafluoroethylene, plasticized polymerized chlorotrifluoroethylene and plasticized interpolymers of tetrafluoroethylene and chlorotrifluoroethylene, and particularly plasticized polymerized tetrafluoroethylene. Other objects are to provide new and improved methods for bonding the aforesaid polymers to themselves and to other materials. Still other objects are to advance the art. Still other objects will appear hereinafter.

The above and other objects may be accomplished in accordance with our invention which comprises heating a solid polymer (solid at atmospheric temperatures), of the group of polymerized tetrafluoroethylene, polymerized chlorotrifluoroethylene and interpolymers of tetrafluoroethylene and chlorotrifluoroethylene, at temperatures between 150° C. and 400° C. with at least 2% by weight of a substantially completely fluorinated hydrocarbon oil, distilling at temperatures in the range of from about 50° C. to about 300° C. at 10 mm. Hg pressure, and continuing such heating until the polymer has absorbed at least 2%, but not substantially more than about 300% by weight of the fluorinated oil. By such procedure, the fluorinated oil is incorporated in the polymer and plasticizes the polymer. The fluorinated oil cannot be pressed out of the product at high pressures and cannot be readily extracted by washing with a solvent therefor, such as trifluorotrichloroethane, at room temperatures but substantial proportions thereof may be extracted from the product by washing with such solvent under refluxing conditions for several hours. The X-ray patterns of the products are identical with those of untreated polymer. Thus, it appears that the fluorinated oil is dissolved in the polymer. The resulting products are softer and more flexible than the untreated polymer, soften at lower temperatures and may be molded, extruded and bonded to themselves more readily and at lower temperatures and pressures.

The substantially completely fluorinated hydrocarbon oils, which may be employed in accordance with our invention, are those which have a distilling range at 10 mm. Hg pressure within the range of from about 50° C. to about 300° C. (about 150° C. to about 460° C. at atmospheric pressures). The term "substantially completely fluorinated" means that substantially all of the hydrogen atoms of the compounds in the hydrocarbon oil have been replaced by fluorine so that the fluorinated oil contains at least 75% chemically combined fluorine. For convenience, the substantially completely fluorinated hydrocarbon oils will be referred to hereinafter as "fluorocarbon oils." These fluorocarbon oils may be obtained by fluorinating a hydrocarbon oil by methods known to the art and then fractionating the fluorinated oil, usually at 10 mm. Hg pressure, to obtain products of desired boiling range. The hydrocarbon oils, employed for preparing the fluorocarbon oils, are mixtures of hydrocarbons and may be naturally occuring mineral oils, such as paraffinic base, naphthenic base or highly aromatic petroleum oils, usually highly refined, or synthetic hydrocarbon oils of similar composition, such as the Fischer-Tropsch oils. Preferably, the hydrocarbon oils are composed wholly or mainly of aliphatic hydrocarbons. Usually, the hydrocarbon oil is vaporized, the vapors diluted with inert gas, and the mixture then passed over a fluorinating agent, such as cobalt trifluoride. Representative fluorocarbon oils and methods for preparing them are disclosed in the articles appearing in Industrial and Engineering Chemistry, vol. 39, No. 3, March 1947 on pages 290 to 291, 292 to 298, 319 to 329, 343 to 345, 350 to 352 and 352 to 354. The fluorocarbon oils, employed in the following examples, were prepared by the process disclosed in the article by Irwin et al., appearing on pages 350 to 352, inclusive, of such publication.

While a fluorocarbon oil fraction, distilling over the full range of from about 50° C. to about 300° C. at 10 mm. pressure, may be employed, it will generally be desirable to employ fractions distilling over narrower ranges within such broad range. It will usually be preferred to employ fluorocarbon oil fractions having distilling ranges wholly above 80° C. at 10 mm. (200° C. at atmospheric pressures) and particularly those having distilling ranges between 80° C. and about 240° C. at 10 mm. (200° C. to 400° C. at atmospheric pressures). We specially prefer to employ fractions having distilling ranges falling in the range of from about 130° C. and about 240° C. at 10 mm. The use of fluorocarbon oils, having constituents distilling below the temperature of treatment, will require the use of pressures to prevent the loss of oil by vaporization during the processing or, alternatively, the use of excess amounts of oil to allow for that lost by vaporization. The plasticity and softening temperature of the products will be dependent primarily upon the proportion of fluorocarbon oil therein rather than on the distilling range of the fluorocarbon oil fraction employed.

In order to obtain the products of our invention, the polymer and the fluorocarbon oil should be heated together at temperatures of at least 150° C., the maximum temperature being that at which objectionable decomposition tends to take place, usually about 400° C. The optimum temperatures will vary with the polymer employed. When a thin sheet of polymerized tetrafluoroethylene is heated in fluorocarbon oil (distilling range 150–170° C./10 mm.) at 150° C., it absorbs the fluorocarbon oil at a rate of about 0.8% by weight per hour. At 225° C., the polymer absorbs the oil at a rate of about 4% by weight per hour. The rate of absorption increases gradually with increase in temperature up to about 327° C. At about 327° C., the absorption of the oil suddenly increases, becoming substantially instantaneous, the sheet puffing to 2 to 3 times its original size and absorbing the fluorocarbon oil at a rate of about 30% by weight in 1 to 5 seconds. This rapid rate of absorption takes place at all temperatures in the range of from about 327° C. to 400° C. Accordingly, with polymerized tetrafluoroethylene, it will generally be desirable to employ temperatures of from about 200° C. to about 400° C. and, preferably, from about 327° C. to about 375° C.

Polymerized chlorotrifluoroethylene will absorb the fluorocarbon oil at a gradually increasing rate with increase in temperature from about 150° C., such rate increasing more rapidly than with polymerized tetrafluoroethylene, but without the sudden increase in rate characteristic of polymerized tetrafluoroethylene at 327° C. The polymerized chlorotrifluoroethylene absorbs the fluorocarbon oil at a rapid rate at minimum temperatures varying from about 225° C. to about 325° C., the minimum temperature increasing with increase in the softening temperature of the polymer. Such rapid absorption also takes place at the higher temperatures up to about 400° C. Accordingly, with polymerized chlorotrifluoroethylene, it will generally be preferred to employ temperatures of from about 250° C. to about 375° C.

Interpolymers of tetrafluoroethylene and chlorotrifluoroethylene, containing from about 10% to about 95% of tetrafluoroethylene, absorb the fluorocarbon oil rapidly at lower temperatures than polymerized chlorotrifluoroethylene. The absorption of the fluorocarbon oil becomes almost instantaneous at minimum temperatures varying from about 190° C. to about 327° C. with variation in the proportion of tetrafluoroethylene in the polymer, such rapid absorption also taking place at higher temperatures. With the interpolymers, it will generally be desirable to employ temperatures of from about 180° C. to about 400° C. When the interpolymers contain from about 10% to about 70% tetrafluoroethylene, it will usually be preferred to employ temperatures of from about 200° C. to about 375° C. and particularly from about 200° C. to about 250° C.

Polymerized tetrafluoroethylene is rendered noticeably more flexible when it has absorbed as little as 2% fluorocarbon oil in accordance with our invention. In general, it will be desirable to incorporate at least 4% fluorocarbon oil in the polymer. A maximum of about 300% fluorocarbon oil can be incorporated into polymerized tetrafluoroethylene by our process, that is, to obtain products containing a minimum of 25% polymer and a maximum of 75% fluorocarbon oil. The plasticity and moldability increases with the proportion of fluorocarbon oil in the product. Products, containing from 2% to about 20% of fluorocarbon oil, are valuable as packing materials for valves, stuffing boxes, etc. The fluorocarbon oil also gives the polymer improved wearing qualities and lubricity. Products, containing 5% or more of fluorocarbon oil, are useful as molding compositions, being moldable under considerably lower pressures than the unplasticized polymer. Products, containing 20% and more of fluorocarbon oil, can be cold drawn and more easily extruded at a more rapid rate to produce more perfect extruded products. The plasticized polymerized tetrafluoroethylene may be caused to adhere to itself at lower temperatures and pressures than unplasticized polymer. For example, two sheets of the plasticized polymer may be bonded by pressing them together at 327° C. and less than 100 lbs./sq. in., whereas, unplasticized polymer requires temperatures of at least 350° C. and pressures over 100 lbs./sq. in. The preferred plasticized polymerized tetrafluoroethylene compositions will contain from about 10% to about 40% fluorocarbon oil.

Polymerized chlorotrifluoroethylene will absorb fluorocarbon oil in an amount up to about 43% of its weight, or that which will produce products containing a maximum of about 30% fluorocarbon oil. Such products, containing from about 2% to about 30% fluorocarbon oil, are more flexible and plastic and may be bonded at lower pressures and at temperatures up to 30° C. lower than the unplasticized polymer.

The amount of fluorocarbon oil, which can be incorporated into the interpolymers to produce plastic products will vary with the composition of the interpolymers, the amount increasing from about 43% to about 300% by weight based on the polymer roughly in proportion to the increase in proportion of tetrafluoroethylene in the polymer. For example, interpolymers, containing 57%, 60% and 70% tetrafluoroethylene, respectively, will produce plastic compositions containing up to about 55%, 57% and 61% fluorocarbon oil. The plasticized interpolymer compositions may contain as little as 2% fluorocarbon oil, but, preferably, will contain from about 10% to about 40% fluorocarbon oil.

The methods for producing the plasticized polymers will vary with the desire of the manufacturer and the results to be obtained. The polymer may be treated in massive form, such as, strips, sheets, rods or other shaped articles which may be sintered or unsintered before treatment with the fluorocarbon oil. Such massive polymer may be immersed in a body of the fluorocarbon oil which is heated to the appropriate temperature for the time required to incorporate the desired amount of fluorocarbon oil in the polymer. This procedure is particularly desirable where a small controlled amount of fluorocarbon oil is to be incorporated in the polymer, and especially where the original size and shape of the article is to be maintained, wherein temperatures in the lower range, where the absorption is slow and swelling does not occur, will be employed. Alternatively, the massive polymer may be subjected to vapors of the fluorocarbon oil heated to the desired treating temperature. Also, where the amount of fluorocarbon oil desired in the polymer is small, the massive polymer may be coated with the fluorocarbon oil, as by painting, spraying or dipping, and the coated article then subjected to heat to cause the oil to penetrate and be absorbed by the polymer, repeating such process as many times as desired. When massive polymer of substantial thickness is so treated, only that at and adjacent the surface may absorb the fluorocarbon oil and become plasticized, the depth of penetration of the fluorocarbon oil depending upon the amount so applied and the time of heating. There may thus be obtained a product having a core of unplasticized polymer and an outer layer of plasticized polymer. Such last procedure may be employed to effect a combined plasticizing of polymer and bonding of polymer to polymer or polymer to a metal having a melting point above 375° C., as by coating one or both of the materials with the fluorocarbon oil and then pressing the materials together and heating to a temperature at which the fluorocarbon oil is absorbed into the polymer. Also, plasticized polymer compositions, containing from about 50% to about 100% fluorocarbon oil, may be employed for bonding unplasticized, or only slightly plasticized, polymer to itself by placing a thin layer of the highly plasticized polymer between the two pieces of polymer to be bonded together and then heating to the temperature at which the fluorocarbon oil dissolves in the polymer.

Usually, it will be desirable to mix the fluorocarbon oil with polymer which is in finely-divided form and then heat the mixture to cause the polymer to absorb the fluorocarbon oil. This procedure is particularly desirable where substantial amounts of oil are to be incorporated in the polymer. The polymer may be in its commonly obtained powder form. When polymer powder is mixed with the fluorocarbon oil at room temperatures, the mixture will usually be in the form of a heavy paste of finely-divided polymer in fluorocarbon oil. Such mixture can be spread in the form of a coating which is grainy and devoid of tensile strength and toughness. Such mixture is sensitive to heat, its viscosity being reduced rapidly on heating up to 100° C. The fluorocarbon oil surrounds the particles of polymer and can be readily extracted from the mixture by washing with a solvent for the fluorocarbon oil, such as, trifluorotrichloroethane. However, when such mixture is heated in accordance with our invention, that is, over a substantial period of time at temperatures at which the polymer slowly absorbs the fluorocarbon oil or for short periods of time at temperatures at which the polymer rapidly absorbs the fluorocarbon oil, the fluorocarbon oil becomes incorporated in the polymer and the mixture is irreversibly converted to a tough plastic mass of high tensile strength which is not sticky to the touch and cannot be smeared into a thin film. In fact, to effect a 100% increase in area of a plastic strip, containing 25% polymerized tetrafluoroethylene and 75% absorbed fluorocarbon oil, requires a pressure of 4000 lbs./sq. in. in a hydraulic press at room temperatures. The viscosity, or plasticity, of the plastic mass shows no or little detectable change when heated over the range of from about 25° C. to about 100° C. A tough adherent layer of plasticized polymer on unplasticized polymer or on a metal having a melting point above 375° C. may be obtained by applying, to the surface of the unplasticized polymer or of the metal, a layer of a mixture of finely-divided polymer in fluorocarbon oil, in which the fluorocarbon oil constitutes from about 50% to about 75% of the mixture, and then heating to convert the mixture to plasticized polymer.

K. L. Berry has discovered and, in his application, Serial No. 695,059 filed September 5, 1946, now Patent No. 2,478,229 August 9, 1949, has disclosed stabilized concentrated aqueous dispersions of colloidal polymerized tetrafluoroethylene, containing from about 25% to about 75% polymer. He discloses that these dispersions may be obtained by polymerizing the tetrafluoroethylene in the presence of water, adding a surface-active agent to the dilute suspension, flocculating the polymer by insolubilizing the surface-active agent, separating the flocculated polymer and a small proportion of the aqueous phase from the bulk of the aqueous phase, and then peptizing the flocculated polymer. The surface-active agents may be anion-active compounds of the class of ammonium, alkali metal and amine salts of long chain carboxylic, sulfonic, and sulfuric acids or cation-active compounds of the class of quaternary ammonium salts containing long aliphatic hydrocarbon chains. The polymer, in the dilute suspensions, may be flocculated by salting out or by acidification. Where the flocculation is accomplished by salting out, the subsequent peptization may be accomplished by dilution, or by removing the salt by heating to volatilize or decompose it, by dialysis or by ion exchange. When the flocculation is produced by acidification, the subsequent peptization can be accomplished by adding a base. Other surface-active agents, which become insoluble upon change in temperature, may be used; in which case, the flocculation will be accomplished by changing the temperature to insolubilize the surface-active agent, and the subsequent peptization may be accomplished by adding a surface-active agent.

G. E. Holbrook has discovered and, in his copending application Serial No. 37,529 filed July 8, 1948, has disclosed that the aqueous dispersions of colloidal polymerized tetrafluoroethylene, obtained by the process of Berry, may be employed to produce tetrafluoroethylene in fluorocarbon oil, containing from about 20% to about 90% fluorocarbon oil. This is accomplished by stirring together the fluorocarbon oil and the aqueous dispersion while coagulating the aqueous dispersion, whereby the colloidal polymerized tetrafluoroethylene becomes suspended in the fluorocarbon oil. The aqueous dispersions may be coagulated by the methods disclosed by Berry for flocculating the polymer. Also, and preferably, the aqueous dispersion is coagulated by adding a water-miscible organic liquid, such as methanol, ethanol, acetone and the like. The water-miscible organic liquid will be employed in the proportion of at least one volume to each volume of the aqueous dispersion and, preferably, 3 or more volumes to each volume of the dispersion. The use of one volume of organic liquid produces a slow coagulation. About 3 volumes produce a rapid coagulation. Excessive amounts of the organic liquid are not harmful since both the polymer and the fluorocarbon oil are insoluble therein. The resulting suspensions of Holbrook vary in properties from greases to plastics. They are all substantially softer than the products of our invention. For example, a suspension, obtained by the process of Holbrook and containing 25% colloidal polymerized tetrafluoroethylene and 75% fluorocarbon oil, can be increased 400% to 500% in area by pressing in a hydraulic press at less than 100 lbs./sq. in. at room temperatures. Such product is very sticky, and the fluorocarbon oil is not pressed out of the product under such conditions or readily extracted therefrom by washing the product with trifluorotrichloroethane at room temperatures.

We have found that such suspensions of colloidal polymerized tetrafluoroethylene in fluorocarbon oil, obtained by the process of Holbrook, can be converted irreversibly to the compositions of our invention by heating them in accordance with our invention, that is, at temperatures of from about 150° C. to about 400° C. This is a preferred procedure for preparing plasticized polymerized tetrafluoroethylene containing substantial proportions of fluorocarbon oil. Such procedure is illustrated in Examples 8 and 9, wherein the aqueous suspensions contained 1% of a commercial wetting agent which is a mixture of neutral esters of 10–18 carbon alcohol sulfuric acids and were prepared by the process of Berry, and the mixing of the suspension with the fluorocarbon oil and the coagulation of the suspension were accomplished by the method of Holbrook as described above.

In order to more clearly illustrate our invention, preferred modes of carrying the same into effect and advantageous results obtained thereby, the following examples are given:

Example 1

Strips of polymerized tetrafluoroethylene (¼ inch thick and ¾ inch wide) were heated in fluorocarbon oil, having a distilling range of 190° C. to 210° C. at 10 mm. pressure, for about 3 hours at a temperature at which the oil smoked (about 200° C. to about 250° C.). The strips were removed from the oil and wiped off to remove adhering oil. The strips were found to have gained about 4% in weight and to be substantially more flexible. Such strips were particularly valuable as packing for valves in an anhydrous HF system and gave trouble-free operation several times longer than untreated strips.

Example 2

A strip of polymerized tetrafluoroethylene was heated at 275° C. with fluorocarbon oil (distilling range 130–300° C./10 mm.) to give a product containing 5.7% fluorocarbon oil. The resulting strip was pressed in a hydraulic press at room temperature under a pressure of 2000 lbs./sq. in. for 50 seconds, whereby it increased 25% in area. When a similar strip of the polymer, not treated with fluorocarbon oil, was similarly pressed, it increased 13% in area.

Example 3

A strip of polymerized tetrafluoroethylene (⅜" x 1¼" x 1/16") was heated in fluorocarbon oil (distilling range 210–240° C./10 mm.). At 285° C., there was slight softening but no perceptible change in dimensions. At 325° C. to 330° C., the strip suddenly puffed to 3 times its original size. After 15 to 20 seconds, the strip was removed from the fluorocarbon oil and cooled. This non-tacky solid, containing about 30% fluorocarbon oil, was then pressed into a continuous film in a hydraulic press at 280° C. under 1000 lbs./sq. in. The film had twice the area of the original strip. Similar treatment of a similar strip, that had not been heated in fluorocarbon oil, resulted in an increase in area of only 25%.

*Example 4*

A strip of polymerized tetrafluoroethylene (0.005" thick) was slowly heated in the fluorocarbon oil described in Example 3. When the temperature reached 300° C., the tape became gelatinous and was immediately removed from the fluorocarbon oil and allowed to cool. The resulting product was plastic and contained 30% fluorocarbon oil and 70% polymer. When rolled into a ball, this plastic mass could be pressed into a continuous film under 1000 lbs./sq. in. at 305° C. to 310° C.

*Example 5*

A strip of solid polymerized tetrafluoroethylene, weighing 3.70 g., was heated in fluorocarbon oil (distilling range 150-170° C./10 mm.) to a temperature of 225° C. for 30 minutes. When removed from the fluorocarbon oil and washed to remove adherent fluorocarbon, it contained 2.1% fluorocarbon oil by weight. This material was considerably more flexible than untreated polymer and was valuable as packing material for valves, etc. None of the 2.1% of fluorocarbon oil was removed from this material by washing at atmospheric temperatures with trifluorotrichloroethane, an excellent solvent for the fluorocarbon oil.

When a strip of the same polymer (not treated with fluorocarbon oil) was heated in an SAE 40 petroleum oil for 1 hour 250° C., there was no noticeable swelling or improvement in the plasticity of the polymer. After cooling and washing at atmospheric temperatures with carbon tetrachloride, the polymer contained not more than 0.05% of hydrocarbon oil. A second such washing with carbon tetrachloride reduced the content of hydrocarbon oil to not more than 0.02%.

*Example 6*

Fluorocarbon oil (distilling range 210-240° C./10 mm.) was spread thinly between two sheets of polymerized tetrafluoroethylene ($\frac{1}{32}$" thick). The sheets were then pressed together in a hydraulic press at 50 lbs./sq. in. and the temperature of the platens of the press raised to 325° C., held for 2 minutes, then cooled to 310° C. before releasing the pressure. The sheets were so firmly bonded that they could not be pulled apart. Identical polymer, treated in a similar manner but without fluorocarbon oil, was not bonded at all. Without the fluorocarbon oil treatment, temperatures of at least 350° C. are necessary to cause similar bonding and, at these temperatures, serious deformation of the polymer occurs.

*Example 7*

Fluorocarbon oil (distilling range 150-170° C./10 mm.) and a 58% aqueous suspension of colloidal polymerized tetrafluoroethylene, in amounts to provide about 73 parts fluorocarbon oil to 27 parts polymer, were placed in a glass vessel. Acetone was added in the proportion of about 1 volume for each volume of suspension. The contents of the vessel were stirred vigorously at room temperatures, whereby the polymer transferred to the fluorocarbon oil phase to form a homogeneous composition of polymer and fluorocarbon oil. The polymer-fluorocarbon oil composition was separated from the aqueous phase and had the consistency of a grease. It was spread evenly and thinly on the inside surface of a nickel crucible. The crucible was then heated gently in a Bunsen burner flame until the film fused (330° C.), and then cooled. Concentrated nitric acid would not then wet the walls of the crucible. Scraping with a knife disclosed the presence of a very thin, adherent, plastic film on the inner surface of the crucible.

*Example 8*

A composition, containing 55% of polymerized tetrafluoroethylene and 45% of fluorocarbon oil (distilling range 130-300° C./10 mm.), was prepared by mixing a 60% aqueous suspension of the polymer, the fluorocarbon oil and acetone with stirring at room temperature as in Example 7. 12 grams of this composition was pressed in a hydraulic press at room temperature. It was then transferred to a similar press, the platens of which were heated to 308° C., pressed at 2000 lbs./sq. in. and the temperature of the platens raised to 325° C., held for 5 minutes, then allowed to cool to 300° C. before releasing the pressure, and then quenched in cold water. The resulting plasticized polymer weighed 9 g. and its fluorocarbon oil content was approximately 27%, part of the fluorocarbon oil being lost by vaporization during the processing. The product was soft and pliable and could be stretched by hand. It was similar to the product of Example 3 but was more elastic and translucent. Similar polymer of similar thickness, but not treated with fluorocarbon oil, cannot be stretched by hand.

*Example 9*

A product, containing 40% polymerized tetrafluoroethylene and 60% fluorocarbon oil, was prepared as described in Example 8 using fluorocarbon oil having a distilling range of from 130° C. to 240° C. at 10 mm. It was a very thick, tacky grease. This product was a good heat-convertible adhesive for tetrafluoroethylene polymer. When the product was spread thinly between 2 sheets of $\frac{1}{16}$" tetrafluoroethylene polymer and the sheets treated in a hydraulic press at 50 lbs./sq. in. and 327° C. to 330° C. the product converted and bonded the sheets together so firmly that the sheets were torn in attempting to pull them apart. Thinner strips of polymer were similarly bonded with the above composition.

*Example 10*

9 grams of an interpolymer (40% chlorotrifluoroethylene and 60% of tetrafluoroethylene) in powder form was heated with 1 g. of fluorocarbon oil (distilling range 60-130° C./10 mm.) in a sealed glass tube at 250° C. for 3 hours. The product, still a powder, could be pressed into a clear sheet at 260° C. to 265° C. and 100 lbs./sq. in. pressure. The original polymer, heated in a similar manner but without fluorocarbon oil, required a pressing temperature of 280° C. to 285° C. to obtain a clear film.

*Example 11*

Two strips of polymerized trifluorochloroethylene, having a softening point of 260° C., were heated with stirring in fluorocarbon oil (distilling range 170–190° C./10 mm.). At 195° C., the two pieces adhered to one another but maintained their original shape. At 315° C., the two pieces fused together. Held for 3 min. at 325° C., the strips completely melted together as a coherent mass. The oil was allowed to cool and, at 250° C., the mass of polymer was removed and cooled to room temperature. It was a dry, hard product and contained about 23% of fluorocarbon oil. It was pressed into a smooth, continuous, tough and pliable film at 210° C. and 2000 lbs./sq. in. in a hydraulic press having a heated platen. The polymer, not treated with fluorocarbon oil, but pressed under identical conditions, formed a very poor film—it being very brittle and crumbly and containing numerous bubbles. Continuous films, such as are produced with the plasticized polymer, are useful as chemically resistant gasket materials and for electrical insulation.

*Example 12*

A strip of ASTM 10–20 steel was sanded to a bright finish. A paste of equal parts of powdery trifluorochloroethylene polymer and fluorocarbon oil (distilling range 150° C. to 170° C./10 mm.) was prepared by milling together at room temperature and a thin film of this paste spread on the steel strip. Upon heating at 260° C. to 270° C., the paste fused and excess fluorocarbon oil was driven off. The coated strip was then immediately quenched in cold water. A total of three coats of polymer film were applied sequentially in this manner. This coating was impervious to concentrated HNO₃ and HCl at room temperature. A strip of the same polymer, in the form of a hot-pressed film, was coated lightly with some of the same fluorocarbon oil and pressed onto the previously coated steel strip in a hydraulic press at 260° C. to 270° C., at about 50 lbs./sq. in. pressure. This polymer adhered to the steel strip as a clear continuous film and could not be pulled off. This procedure enables one to quickly apply a chemically inert liner to iron and steel equipment.

*Example 13*

An interpolymer of tetrafluoroethylene and chlorotrifluoroethylene, containing 10% tetrafluoroethylene, was pressed into a clear continuous, tough film of good tensile strength at a temperature of 225° C. and 100 lbs./sq. in. At temperatures lower than this, the film was very brittle. A temperature of 190° C. was necessary to even start sintering of the polymer and the film formed contained many small bubbles and was very brittle. 10% fluorocarbon oil (distilling range 190–210° C./10 mm.) was incorporated into such interpolymer by heating to 190° C. for about 1 minute. This composition was pressed into a clear continuous film at 190° C. and 100 lbs./sq. in., which film was somewhat brittle. However, the film, obtained at 200° C. with the plasticized interpolymer, was equivalent in strength to the film obtained at 225° C. with unplasticized interpolymer.

*Example 14*

An interpolymer of tetrafluoroethylene and chlorotrifluoroethylene, containing about 95% tetrafluoroethylene, was pressed at various temperature in a hydraulic press in order to obtain a clear continuous tough film. At 305–310° C. and 1000 lbs./sq. in., a clear film was obtained but it lacked tensile strength. At 325° C. and the same pressure, the film was clear and fairly tough. About 15% of fluorocarbon oil (distilling range 190–210° C./10 mm.) was incorporated into such interpolymer by heating at 280° C. for 3 minutes. This composition was pressed into a film at 305° C. and 100 lbs./sq. in., which film was superior in toughness and clarity to films obtained from unplasticized interpolymer at 325° C. and the same pressure.

*Example 15*

A strip of ASTM 10–20 steel was sand-blasted and painted lightly with fluorocarbon oil (distilling range 150–170° C./10 mm.). A film of polymerized chlorotrifluoroethylene (obtained by pressing powdered polymer at 260° C. and 100 lbs./sq. in.) was placed on the painted surface and then pressed at 265° C. and 100 lbs./sq. in. in a hydraulic press. The film was bonded to the steel so firmly that the polymer was torn in attempting to remove it from the steel.

It will be understood that the preceding examples have been given for illustrative purposes solely and our invention is not limited to the specific embodiments disclosed therein. Many variations and modifications in the proportions, methods of bringing the materials together and in otherwise carrying out our process will be apparent to those skilled in the art. If desired, pigments, fillers, fibers and the like may be incorporated in our compositions.

From the preceding description and examples, it will be apparent that we have effectively solved the problem of plasticizing this class of polymeric materials and, particularly, polymerized tetrafluoroethylene. The products of our invention are of substantially increased practical value. The fluorocarbon oil is highly resistant to the action of chemicals and heat and hence, by our invention, these valuable properties of the polymers are not decreased. The products are more flexible and more easily worked and have improved lubricity so that their wearing qualities and utility have been greatly increased. Accordingly, it will be apparent that our invention constitutes a valuable contribution to the art.

We claim:

1. A plasticized solid polymer which is a solid polymer of the group consisting of polymerized tetrafluoroethylene, polymerized chlorotrifluoroethylene and interpolymers of tetrafluoroethylene and chlorotrifluoroethylene having dissolved therein a substantially completely fluorinated hydrocarbon oil distilling at temperatures in the range of from about 50° C. to about 300° C. at 10 mm. Hg pressure, the fluorinated oil constituting from about 2% to about 75% by weight of the plasticized polymer.

2. A plasticized solid polymer which is a solid polymer of the group consisting of polymerized tetrafluoroethylene, polymerized chlorotrifluoroethylene and interpolymers of tetrafluoroethylene and chlorotrifluoroethylene having dissolved therein a substantially completely fluorinated hydrocarbon oil distilling at temperatures in the range of from about 50° C. to about 300° C. at 10 mm. Hg pressure, the fluorinated oil in the plasticized polymer constituting from a minimum of about 2% to a maximum varying from about 30% to about 75% as the tetrafluoroethylene in the polymer varies from 0% to 100%.

3. A plasticized solid polymer which is solid polymerized tetrafluoroethylene having dissolved therein a substantially completely fluorinated hydrocarbon oil distilling at temperatures in the range of from about 50° C. to about 300° C. at 10 mm. Hg pressure, the fluorinated oil constituting from about 2% to about 75% by weight of the plasticized polymer.

4. A plasticized solid polymer which is a solid interpolymer of tetrafluoroethylene and chlorotrifluoroethylene having dissolved therein a substantially completely fluorinated hydrocarbon oil distilling at temperatures in the range of from about 50° C. to about 300° C. at 10 mm. Hg pressure, the fluorinated oil in the plasticized polymer constituting from a minimum of about 2% to a maximum varying from about 30% to about 75% as the tetrafluoroethylene in the interpolymer varies from substantially 0% to substantially 100%.

5. A plasticized solid polymer which is a solid interpolymer of tetrafluoroethylene and chlorotrifluoroethylene, in which the tetrafluoroethylene constitutes at least 50% of the interpolymer, having dissolved therein a substantially completely fluorinated hydrocarbon oil distilling at temperatures in the range of from about 50° C. to about 300° C. at 10 mm. Hg pressure, the fluorinated oil constituting from about 2% to about 75% by weight of the plasticized polymer.

6. The process of preparing a plasticized polymer which comprises heating a solid polymer of the group consisting of polymerized tetrafluoroethylene, polymerized chlorotrifluoroethylene and interpolymers of tetrafluoroethylene and chlorotrifluoroethylene at temperatures between 150° C. and 400° C. with at least 2% by weight of a substantially completely fluorinated hydrocarbon oil distilling at temperatures in the range of from about 50° C. to about 300° C. at 10 mm. Hg pressure, and continuing such heating until the polymer has dissolved at least 2% but not substantially more than about 300% by weight of the fluorinated oil.

7. The process of preparing a plasticized polymer which comprises heating solid polymerized tetrafluoroethylene at temperatures between 150° C. and 400° C. with at least 2% by weight of a substantially completely fluorinated hydrocarbon oil distilling at temperatures in the range of from about 50° C. to about 300° C. at 10 mm. Hg pressure, and continuing such heating until the polymer has dissolved at least 2% but not substantially more than about 300% by weight of the fluorinated oil.

8. The process of preparing a plasticized polymer which comprises heating solid polymerized tetrafluoroethylene at temperatures of from about 200° C. to 400° C. with at least 2% by weight of a substantially completely fluorinated hydrocarbon oil distilling at temperatures in the range of from about 50° C. to about 300° C. at 10 mm. Hg. pressure, and continuing such heating until the polymer has dissolved at least 2% but not substantially more than about 300% by weight of the fluorinated oil.

9. The process of preparing a plasticized polymer which comprises heating solid polymerized tetrafluoroethylene at temperatures of from about 327° C. to about 375° C. with at least 2% by weight of a substantially completely fluorinated hydrocarbon oil distilling at temperatures in the range of from about 50° C. to about 300° C. at 10 mm. Hg pressure, and continuing such heating until the polymer has dissolved at least 2% but not substantially more than about 300% by weight of the fluorinated oil.

10. The process of preparing a plasticized polymer which comprises mixing finely-divided solid polymerized tetrafluoroethylene with from about 25% to about 300% by weight of a substantially completely fluorinated hydrocarbon oil distilling at temperatures in the range of from about 50° C. to about 300° C. at 10 mm. Hg pressure, and heating the mixture at a temperature of from about 327° C. to about 375° C. until the mixture converts to a homogeneous plastic mass.

11. The process of preparing a plasticized polymer which comprises heating a solid interpolymer of tetrafluoroethylene and chlorotrifluoroethylene at temperatures between 150° C. and 400° C. with at least 2% by weight of a substantially completely fluorinated hydrocarbon oil distilling at temperatures in the range of from about 50° C. to about 300° C. at 10 mm. Hg pressure, and continuing such heating until the polymer has absorbed at least 2% but not substantially more than about 300% by weight of the fluorinated oil.

12. The process of preparing a plasticized polymer which comprises heating a solid interpolymer of tetrafluoroethylene and chlorotrifluoroethylene at temperatures of from about 190° C. to about 375° C. with at least 2% by weight of a substantially completely fluorinated hydrocarbon oil distilling at temperatures in the range of from about 50° C. to about 300° C. at 10 mm. Hg pressure, and continuing such heating until the polymer has dissolved at least 2% but not substantially more than about 300% by weight of the fluorinated oil.

13. The process of preparing a plasticized polymer which comprises heating a solid interpolymer of tetrafluoroethylene and chlorotrifluoroethylene at temperatures of from about 190° C. to about 250° C. with at least 2% by weight of a substantially completely fluorinated hydrocarbon oil distilling at temperatures in the range of from about 50° C. to about 300° C. at 10 mm. Hg pressure, and continuing such heating until the polymer has dissolved at least 2% but not substantially more than about 300% by weight of the fluorinated oil.

14. The process of preparing a plasticized polymer and simultaneously bonding the plasticized polymer to a metal having a melting point above 375° C. which comprises applying to the surface of the metal a substantially completely fluorinated hydrocarbon oil distilling at temperatures in the range of from about 50° C. to about 300° C. at 10 mm. Hg pressure and a polymer of the group consisting of polymerized tetrafluoroethylene, polymerized chlorotrifluoroethylene and interpolymers of tetrafluoroethylene and chlorotrifluoroethylene, there being a film of the fluorinated oil between the polymer and the surface of the metal, and then heating at from about 260° C. to about 375° C.

15. The process of preparing a plasticized polymer and simultaneously bonding the plasticized polymer to a metal having a melting point above 375° C. which comprises applying to the surface of the metal a substantially completely fluorinated hydrocarbon oil distilling at temperatures in the range of from about 50° C. to about 300° C. at 10 mm. Hg pressure and a polymer of the group consisting of polymerized tetrafluoroethylene, polymerized chlorotrifluoroethylene and interpolymers of tetrafluoroethylene and chlorotrifluoroethylene, the polymer being admixed in the fluorinated oil in finely-divided form and constituting not more than 50% of the mixture, and then heating at from about 260° C. to about 375° C.

16. The process of preparing a plasticized polymer and simultaneously bonding the plasticized polymer to a metal having a melting point above 375° C. which comprises applying to the surface of the metal a substantially completely fluorinated hydrocarbon oil distilling at temperatures in the range of from about 50° C. to about 300° C. at 10 mm. Hg pressure and polymerized tetrafluoroethylene, there being a film of the fluorinated oil between the polymer and the surface of the metal, and then heating at from about 327° C. to about 375° C.

17. The process of preparing a plasticized polymer and simultaneously bonding the polymer to like polymer which comprises placing between two surfaces of a polymer of the group consisting of polymerized tetrafluoroethylene, polymerized chlorotrifluoroethylene and interpolymers of tetrafluoroethylene and chlorotrifluoroethylene, a layer of a fluorocarbon oil composition of the group consisting of a substantially completely fluorinated hydrocarbon oil distilling at temperatures in the range of from about 50° C. to about 300° C. at 10 mm. Hg pressure and such fluorinated oil having admixed therein finely-divided polymer of the above recited group in a proportion up to 50% of the mixture, and then heating at from about 260° C. to about 375° C.

18. The process of preparing a plasticized polymer and simultaneously bonding the polymer to like polymer which comprises placing between two surfaces of polymerized tetrafluoroethylene, a layer of fluorocarbon oil composition of the group consisting of a substantially completely fluorinated hydrocarbon oil distilling at temperatures in the range of from about 50° C. to about 300° C. at 10 mm. Hg pressure and such fluorinated oil having admixed therein finely-divided polymerized tetrafluoroethylene in a proportion up to 50% of the mixture, and then heating at from about 327° C. to about 375° C.

19. The process of preparing a plasticized polymer which comprises mixing an aqueous dispersion of colloidal solid polymerized tetrafluoroethylene with from about 25% to about 300% by weight, based on the polymerized tetrafluoroethylene, of a substantially completely fluorinated hydrocarbon oil distilling at temperatures in the range of from about 50° C. to about 300° C. at 10 mm. Hg pressure, coagulating the dispersion while stirring the mixture to form a suspension of the colloidal polymerized tetrafluoroethylene in the fluorinated hydrocarbon oil, separating the suspension from the aqueous phase, and heating the suspension at a temperature of from about 327° C. to about 375° C. until the mixture converts to a homogeneous plastic mass.

J. DENNY COMPTON.
JOSEPH W. JUSTICE.
CARL F. IRWIN.

No references cited.